(12) United States Patent
Mariani et al.

(10) Patent No.: US 9,305,667 B1
(45) Date of Patent: Apr. 5, 2016

(54) NUCLEAR FUEL ALLOYS OR MIXTURES AND METHOD OF MAKING THEREOF

(71) Applicants: Robert Dominick Mariani, Idaho Falls, ID (US); Douglas Lloyd Porter, Idaho Falls, ID (US)

(72) Inventors: Robert Dominick Mariani, Idaho Falls, ID (US); Douglas Lloyd Porter, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 448 days.

(21) Appl. No.: 13/832,261

(22) Filed: Mar. 15, 2013

(51) Int. Cl.
*G21C 3/60* (2006.01)

(52) U.S. Cl.
CPC ........................................ *G21C 3/60* (2013.01)

(58) Field of Classification Search
CPC .......................................................... G21C 3/60
See application file for complete search history.

(56) References Cited

U.S. PATENT DOCUMENTS

| | | | | |
|---|---|---|---|---|
| 4,011,133 | A * | 3/1977 | Bloom et al. | 376/457 |
| 5,867,552 | A * | 2/1999 | Marlowe et al. | 376/457 |
| 2012/0201341 | A1* | 8/2012 | Mariani | 376/354 |

FOREIGN PATENT DOCUMENTS

| | | | |
|---|---|---|---|
| DE | 2208672 A | * | 9/1972 |
| GB | 1199130 A | * | 7/1970 |

OTHER PUBLICATIONS

English Abstract of DE 2208672.*

* cited by examiner

*Primary Examiner* — Veronica F Faison
(74) *Attorney, Agent, or Firm* — Felisa L. Leisinger; Michael J. Dobbs; John T. Lucas

(57) ABSTRACT

Nuclear fuel alloys or mixtures and methods of making nuclear fuel mixtures are provided. Pseudo-binary actinide-M fuel mixtures form alloys and exhibit: body-centered cubic solid phases at low temperatures; high solidus temperatures; and/or minimal or no reaction or inter-diffusion with steel and other cladding materials. Methods described herein through metallurgical and thermodynamics advancements guide the selection of amounts of fuel mixture components by use of phase diagrams. Weight percentages for components of a metallic additive to an actinide fuel are selected in a solid phase region of an isothermal phase diagram taken at a temperature below an upper temperature limit for the resulting fuel mixture in reactor use. Fuel mixtures include uranium-molybdenum-tungsten, uranium-molybdenum-tantalum, molybdenum-titanium-zirconium, and uranium-molybdenum-titanium systems.

20 Claims, 12 Drawing Sheets

US 9,305,667 B1

NUCLEAR FUEL ALLOYS OR MIXTURES AND METHOD OF MAKING THEREOF

STATEMENT REGARDING FEDERALLY SPONSORED RESEARCH OR DEVELOPMENT

The United States Government has rights in this invention pursuant to Contract No. DE-AC07-05ID14517, between the U.S. Department of Energy (DOE) and Battelle Energy Alliance, representing Idaho National Laboratory (INL).

FIELD OF THE DISCLOSURE

The present disclosure relates generally to nuclear fission fuel compositions, and more particularly to metallic additives for use in nuclear fuel mixtures, and methods for selecting the additive species and amounts thereof.

BACKGROUND OF THE DISCLOSURE

Metals and alloys thereof are used in nuclear fuels to increase burn up (fuel utilization) and to gain beneficial chemical, thermal, and mechanical properties over pure or combined actinide fuels, such as uranium (U) and plutonium (Pu). For example, an additive is often mixed with uranium to form a pseudo-binary mixture "U-xM," where "M" is a metallic additive, and "x" conveys relative amount information. The metallic additive can be an elemental metal, an alloy of metals, or a mixture of metals. Typically, "x" refers to the weight of the additive as a percentage of the whole U-xM mixture. More generically, U-M refers to a mixture having uranium and a metallic additive without indication of relative amounts or whether the metallic additive is a single metal or an alloy or mixture of metals.

Zirconium (Zr) in particular is added to actinide metal fuels to produce mixtures having relatively high solidus temperatures, below which only the solid phase is present. The liquid phase is prohibited in nuclear fuel materials by, for example, regulations of the Nuclear Regulatory Commission (NRC) of the United States. Zirconium additives are also believed to reduce the chemical reactivity of a fuel mixture with materials such as iron (Fe), which is typically present in the steel cladding of a fuel rod. For example, a cylindrical slug of U—Pu-10Zr has been encased in steel cladding to produce a fuel rod.

Despite that the chemical components of a nuclear fuel slug are typically uniformly mixed prior to service in an induced fission environment, thermodynamic processes ultimately govern the spatial arrangement of the components, which may migrate even when only the solid phase is macroscopically present. Zirconium, for example, can migrate along temperature gradients to the hottest zone, if hot enough to produce a phase with high solubility for Zr, typically the central core of a cylinder, within an in-use fuel slug such that a central zirconium-rich region is formed and a corresponding radial zirconium-depleted region appears over time. Whatever the geometry, any redistribution of the chemical components of a nuclear fuel slug inhibits accurate modeling and complicates efforts toward designing and implementing a nuclear fuel rod and predicting its performance over time.

BRIEF SUMMARY OF THE DISCLOSURE

In various exemplary embodiments, a nuclear fission fuel mixture includes at least one naturally fissioning actinide, and a ternary metallic additive that includes a metal first component as a first percentage of the additive total weight, a metal second component as a second percentage of the additive total weight, and a metal third component as a third percentage of the additive total weight, wherein the first percentage, second percentage, and third percentage sum to about one hundred percent. The first percentage, second percentage, and third percentage are selected in a solid phase region of an isothermal ternary phase diagram of the ternary metallic additive taken at a temperature between about 450 Celsius degrees and about 700 Celsius degrees.

In another exemplary embodiment, a nuclear fission fuel mixture is provided for use in a fission reactor in which the nuclear fission fuel mixture stays below an upper temperature limit. The nuclear fission fuel mixture includes at least one naturally fissioning actinide as a first percentage of the total weight of the nuclear fission fuel mixture, molybdenum as a second percentage of the total weight of the nuclear fission fuel mixture, and one or more metals other than molybdenum as a third percentage of the total weight of the nuclear fission fuel mixture. The first percentage, second percentage, and third percentage are selected such that the nuclear fission fuel mixture exhibits a solidus temperature above the upper temperature limit.

In yet another exemplary embodiment, a method of making nuclear fission fuel includes providing at least one naturally fissioning actinide, providing molybdenum, providing a metal(s) other than molybdenum, and preparing a total weight of a fuel mixture by mixing the at least one naturally fissioning actinide, the molybdenum, and the metal. The fuel mixture includes the at least one naturally fissioning actinide as a first percentage of the total weight, the molybdenum as a second percentage of the total weight, and the metal as a third percentage of the total weight. The first percentage, second percentage, and third percentage are selected in a body-centered cubic solid phase region of a phase diagram of the fuel mixture.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 7:
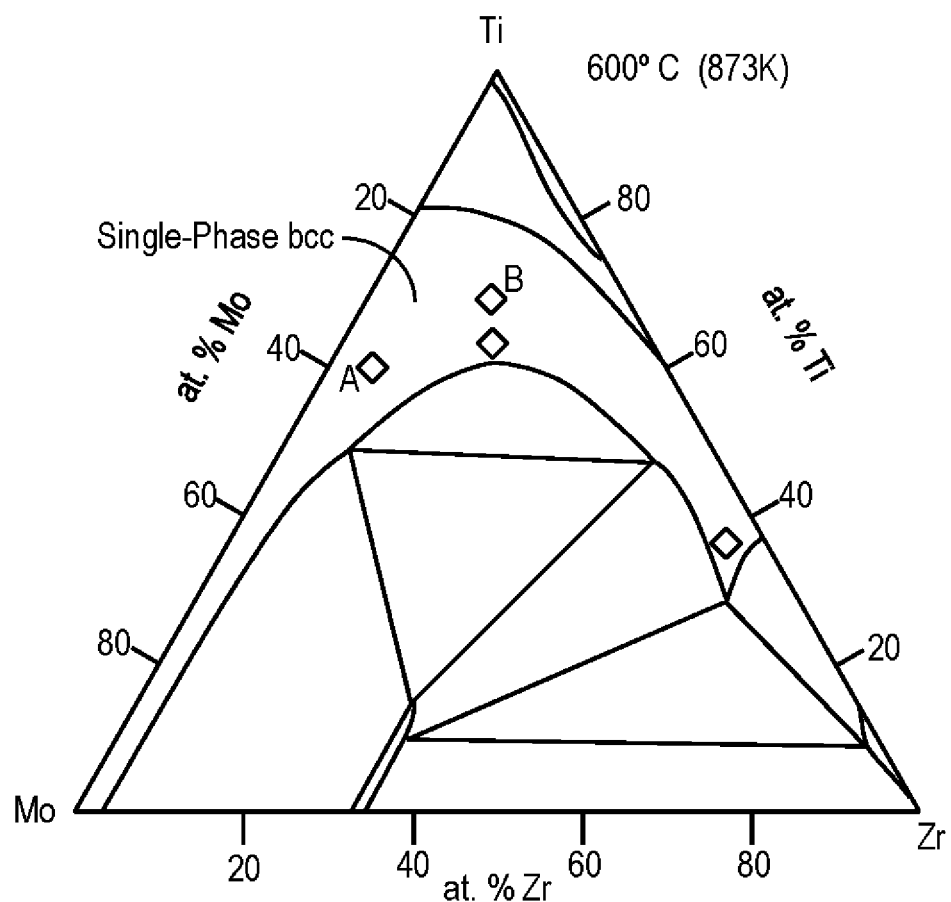
FIG. 7 is a ternary phase diagram of the Mo—Ti—Zr system, in which several embodiments of fuel additives are shown.

In various exemplary embodiments, nuclear fuel alloys or mixtures and methods of making nuclear fuel mixtures are provided. Pseudo-binary actinide-M fuel mixtures described herein are expected to form alloys and exhibit: body-centered cubic solid phases at advantageously low temperatures; high solidus temperatures; and/or minimal or no reaction or interdiffusion with steel and other cladding materials. Methods described herein through metallurgical and thermodynamics advancements guide the selection of amounts of fuel mixture components by use of phase diagrams. For example, weight percentages for components of a metallic additive to an actinide fuel are selected in a solid phase region of an isothermal phase diagram, such as shown in FIG. 7, taken at a temperature below an upper temperature limit for the resulting fuel mixture in reactor use. The upper temperature limit can be the melting point of solid uranium (1135° C.), or above 1200° C., or preferably above 1250° C. Advantageous exemplary U-M fuel mixtures and metallic additive M mixtures are described herein. Methods of selecting and making such mixtures, with particular regard to selecting relative component amounts, are also described. Several embodiments of particular mixture types are described herein, some of which at least were arrived upon by way of the above considerations and others.

Uranium-molybdenum-tungsten (U—Mo—W) mixtures are detailed in the following descriptions, in which reference is made to various mixtures collectively as the U—Mo—W system. For example, the U—Mo—W system in the range of 90U-10Mo-0W (wt. %) to 80U-10Mo-10W (wt. %) is described, wherein the latter refers to a mixture composed of 80% U by weight, 10% Mo by weight, and 10% W by weight. Mixtures in the uranium-molybdenum-tantalum (U—Mo—Ta) system are also described. For example, the U—Mo—Ta system in the range of 90U-10Mo-0Ta (wt. %) to 80U-10Mo-10Ta (wt. %) is described. The Mo—Ti—Zr system is described for use in U-xM (wt. %) fuel mixtures, in which, for example 5≤x≤20. Furthermore, a region of the U—Mo—Ti system having corners at approximately 98U-2Ti, 90U-10Mo, 87U-11Mo-2Ti, and 90U-9Mo-1Ti is described.

U—Pu-M systems should be considered within the scope of these descriptions wherever U-M systems and actinides are expressly recited. Note, however, that U—Pu-xM and U-xM refer to mixtures having the same metallic additive (M) content by weight, but different amounts of U according to Pu content, of which Pu is typically the lesser ingredient (wt. %). It is believed that plutonium has a greater adverse effect than uranium with regard to compromising the advantageously raised solidus temperatures gained by supplementing fissile material with metallic additives.

Figure 1:
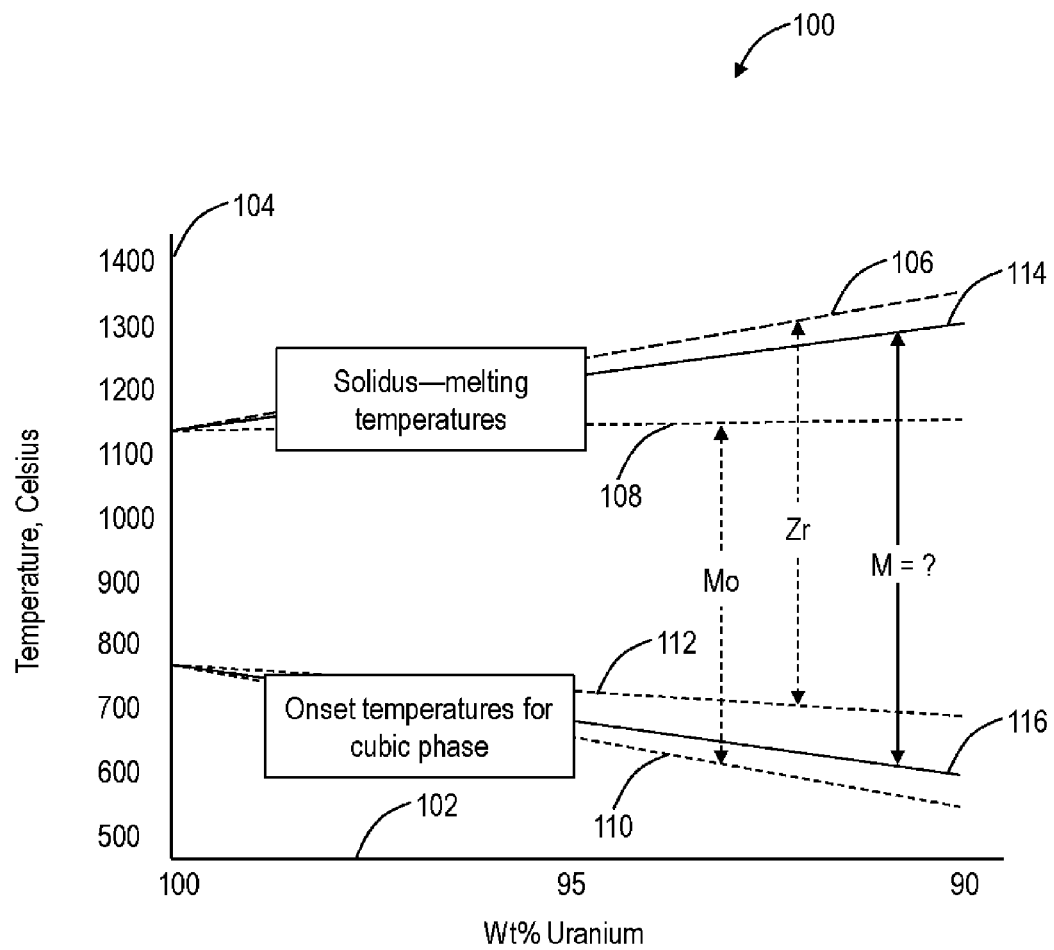
FIG. 1 is a plot that provides approximate solidus temperatures for U-xZr and U-xMo mixtures.

An understanding of various embodiments described herein and the benefits thereof may be improved by consideration of FIG. 1, which is a plot 100 that provides approximate solidus temperatures for U-xZr and U-xMo mixtures from pure U (100 wt. % uranium) to x=10 (90 wt. % uranium) as represented between a U-wt. % axis 102 and a temperature axis 104. As represented by a dashed line 106, the U—Zr system exhibits raised solidus temperatures relative to pure uranium, particularly as Zr is increased (% wt.). As represented by a dashed line 108, the U—Mo system exhibits little or no change in solidus temperatures relative to uranium in the range shown. Furthermore, while U—Mo fuels react more readily with Fe and steel than do U—Zr fuels, U—Mo fuels do not typically undergo migration. U—Mo alloy exhibits low melting temperature particularly when Pu is included in the alloy. The U—Mo system, however, advantageously exhibits bcc-onset temperatures (dashed line 110) below those of uranium and the U—Zr system (dashed line 112), particularly as Mo is increased (wt. %) up to 10 wt %. Note that the solidus and bcc-phase onset temperatures for 100% U are indicated respectively by the convergence of corresponding dashed lines (106, 108) and (110,112). Embodiments set forth herein specify metallic additives (M=?) and analyses for selecting such metallic additives, which are expected to exhibit advantageously high solidus temperatures (solid line 114) and low bcc-phase onset temperatures (solid line 116), both of which are desirable in metallic nuclear fuel performance. For example, novel pseudo-binary and ternary U—Mo fuel systems described herein are expected to exhibit lower onset temperatures for bcc phase than simple U—Zr fuels, and higher solidus temperatures than simple U—Mo fuels. New methods of analysis and selection determine possible new alloy systems and composition ranges expected to show desired improvements. Previous selection methods followed a more Edisonian approach.

A metallic nuclear fuel according to at least one exemplary embodiment described herein does not undergo constituent migration, has a high solidus temperature, is minimally reactive toward steel cladding, is safer overall, more predictable, and potentially exhibits higher ultimate burn up. Such fuels may be advantageous, for example, in fast nuclear reactors.

The stability of a nuclear fuel mixture can be enhanced by increasing the melting temperature and lowering the bcc-phase onset temperature. Melting temperatures are an indication of bond strength, and melting typically proceeds from the body-centered cubic (bcc) phase. Thus, the stability of a U-M or U—Pu-M fuel mixture can be inferred from the solidus temperature of the fuel mixture itself, or even that of M, which may be a single metal or a metallic mixture that is binary, ternary, or higher. The lowering of γ-U (gamma-U, the bcc-phase) onset temperatures for U-M fuel mixtures is believed to be advantageous with particular regard to minimizing the redistribution of mixture components by migration at reactor temperatures and interdiffusion between fuel alloy and steels. If a cubic phase of a fuel alloy is achieved, thermal expansion is expected to be isotropic and migration is expected to be minimized or prevented. According to various embodiments described herein, a preferred species of U-M, U—Pu-M or M (FIG. 1) exhibits a widened temperature range between its bcc-phase onset temperature (line 116) and its solidus temperature (line 114). That is, a preferred species has a wide bcc-phase temperature range in which component migration is inhibited and melting is avoided. Fuel properties, such as thermal conductivity, will be more uniform throughout the fuel body when the fuel body is single phase and cubic.

The solidus temperatures for species of the U—Pu—Mo and U—Pu—Zr systems can be compared to assess the improved stability of these systems relative to U—Pu only. For example, the solidus of U-19Pu-10Mo (wt. %), corresponding to $U_{62.1}Pu_{16.2}Mo_{21.7}$ (at. %), is 1000 degrees Celsius. The solidus of U-19Pu-10Zr ($U_{61.4}Pu_{16}Zr_{22.6}$ in at. %) is 1150 degrees Celsius. For this ratio of U to Pu (U-21Pu, in wt % or at. % approximately), the solidus is approximately 950 degrees Celsius. That the transition at melting is from the γ-U (bcc) phase in all three cases indicates that the presence of molybdenum stabilizes the γ-U phase a little against melting (approx. 50 degrees Celsius), while the presence of zirconium stabilizes it quite a bit more (approx. 200 degree Celsius). The stabilization of the γ-U phase toward melting is chemical (metallurgical) in nature, so that the propensity of reaction or interdiffusion with iron (steel) can also be ranked by the solidus temperature, provided the dissolved Mo and Zr in the alloys are not reacting differentially and more strongly toward the steel than U and Pu. U—Mo based fuel alloys according to embodiments herein offer a solidus comparable to or better than U—Zr. The net result is not only a fuel alloy that is safer with regard to melting temperature in the off-normal event, but is also less reactive toward steel. Compositions and alloy systems described herein were determined in view of these considerations, which considerations correspond to novel analyses and methods.

Figure 2:
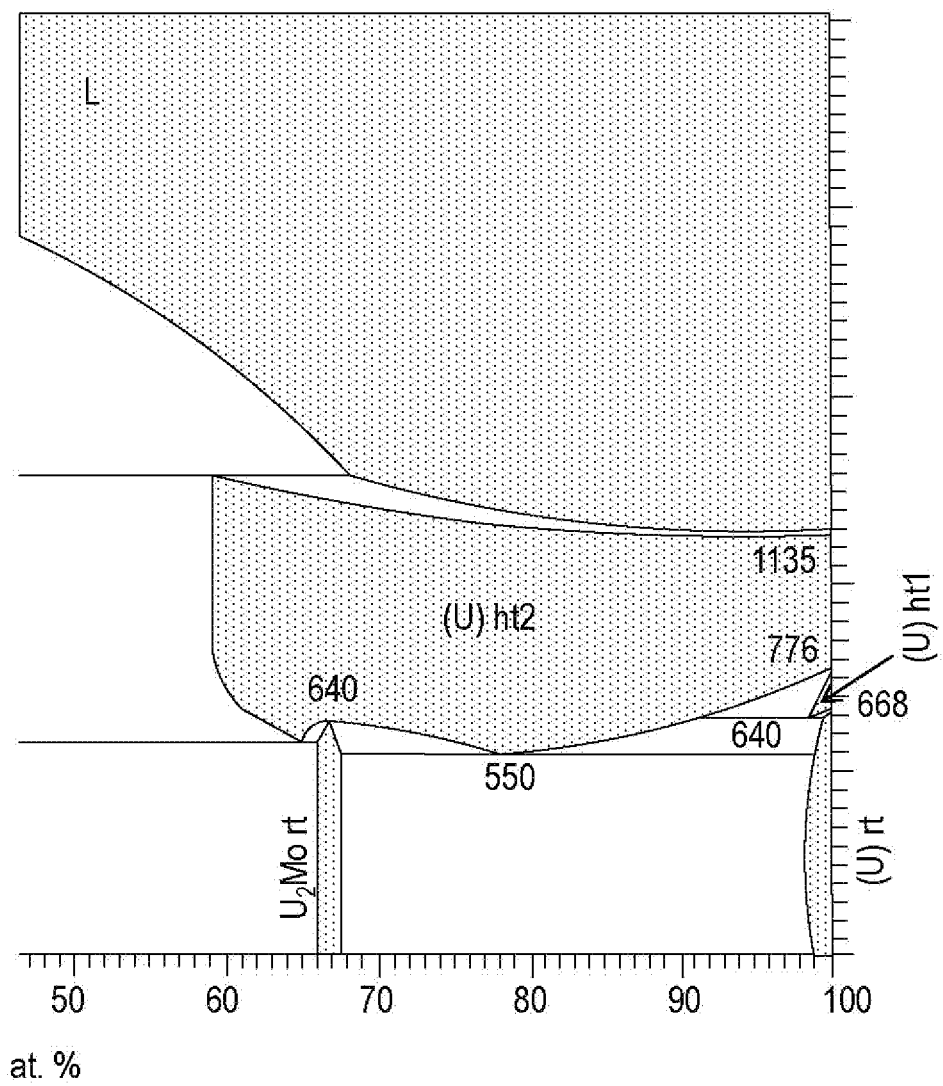
FIG. 2 is a phase diagram of the U—Mo system across a limited range of U content.

FIG. 2 is a phase diagram of the U—Mo system across a range of U content (at. %). As shown, liquid phase (L) develops in U—Mo above 1135 degrees Celsius (solidus), with modest increases shown with decreasing U. A high-temperature two-phase region, (U)ht2, is the γ-U or bcc-phase region having an onset temperature of 550 degrees Celsius near 80% uranium. At lower temperatures an alpha (a) phase is present. A high solidus temperature and a low γ-U onset are desired of candidate alloys and mixtures. In Table 1, several U, Pu, Mo and Zr systems are considered. Of which, U-10Zr (wt. %) exhibits the highest solidus temperature.

TABLE 1

| Alloy | Solidus (degrees Celsius) |
|---|---|
| U—10Zr | 1350 |
| U—10Mo | 1150 |
| U—19Pu—10Zr | 1150 |
| U—19Pu—10Mo | 1000 |
| U—21Pu | 950 |

Stabilization of fuel is approached, according to embodiments herein, by developing alloys with high solidus temperatures. Melting temperature is a direct indication of bond strength in extended solids, for example tungsten (W) and carbon (C). Such direct indication is expected among different fuel alloys if all of the alloys to be compared enter liquid phase from γ-U.

Figure 3:
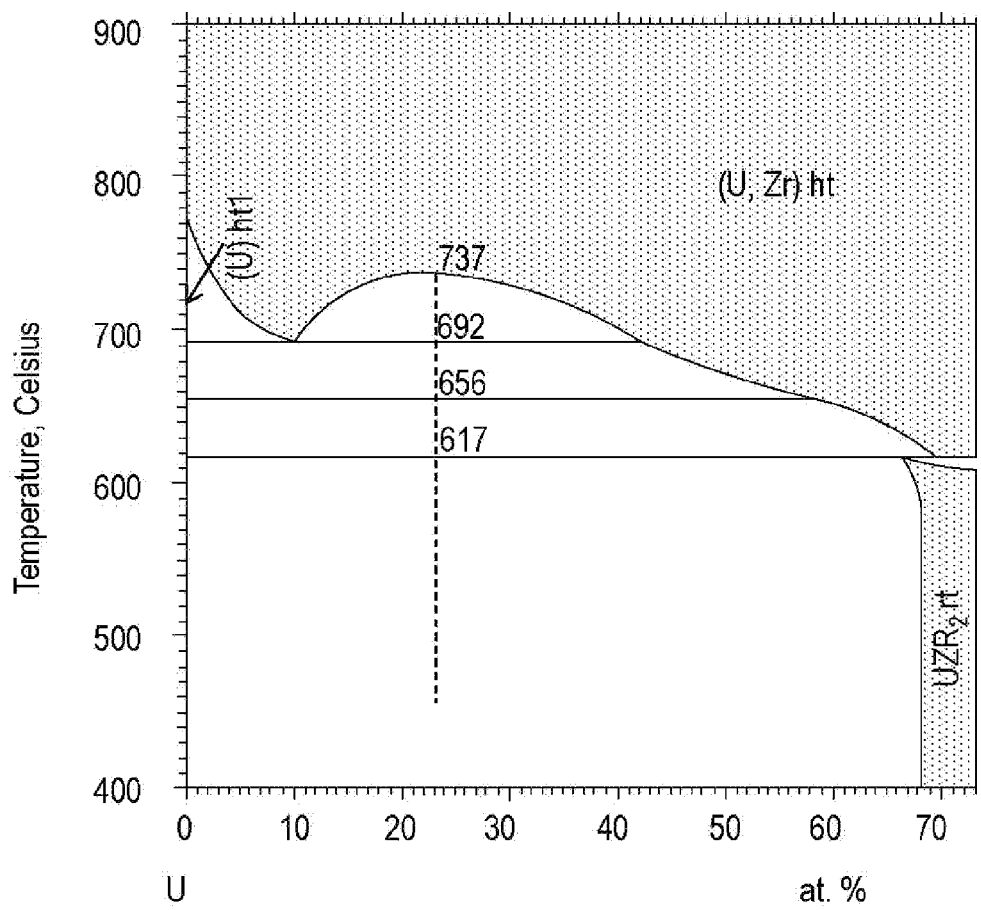
FIG. 3 is a phase diagram of the U—Zr system.

FIG. 3 is a phase diagram of the U—Zr system, in which multiple phases are exhibited at typical reactor temperatures (approximately 430-730 degrees Celsius). Between 435 and 617 degrees, α-U and δ-UZr$_2$ (delta-UZr$_2$) are present. Between 617 and 656, α-U and γ-2 are present. Between 656 and 692, β-U (beta-U) and γ-2 are present. Between 692 and 737 degrees Celsius, γ-1 and γ-2 are present.

Owing to the radial temperature gradient within U—Zr and U—Pu—Zr alloy fuel slugs while under irradiation, and the ensuing thermochemical gradient, constituent migration occurs within the fuel. As a consequence, the fuel properties (such as melting point, density, thermal conductivity, etc.) can vary markedly between the center and periphery of the fuel slug. Zirconium is used to raise the solidus of the fuel composition and guard against melting, and additional benefit is realized because zirconium migrates toward the center (hottest) part of the fuel when the hottest part is in the γ phase region. It is now recognized that the presence of the bcc-phase (γ-U) excludes anisotropic fuel expansion, and for this reason it is desirable to lower the onset temperature of the bcc-phase through alloying and stabilize it as much as possible to lower temperatures. The bcc-phase is also desirable in the case of an off-normal, rapid, high-temperature excursion if a Zr-depleting zone exists along the radius of the fuel slug. If, for example, the bcc phase is stable over a larger range of fuel temperatures, then Zr migration would be less and perhaps, due to the lack of mobility of Zr at low temperatures, may not occur. The solidus temperature would be only minimally affected, and only in the cooler operating areas of the fuel and the high temperature off-normal event becomes less a concern.

In the case of eutectoid U-10Mo (wt. %), the γ-U forms at 550 degrees Celsius. In U-10Zr, the γ phase is fully formed (γ-1 plus γ-2) at 680 degrees Celsius (the eutectoid composition and temperature are approximately U-65Zr and 610 degrees Celsius). However, the U-10Mo system also offers a lower solidus temperature compared to U—Zr, which is less desirable for fuel performance, and the same is true for the comparable ternary U—Pu-M systems (M=Mo or Zr). Moreover, the U—Pu—Mo system appears to react and interdiffuse with iron and steels more aggressively, and perhaps at lower temperatures, as compared to the corresponding U—Pu—Zr alloys (at least for some compositions if not uniformly for all). As a consequence, it is desirable to develop a fuel alloy formulation that 1) stabilizes the bcc γ-U phase at as low a temperature as possible and that 2) offers a solidus temperature that is high, but not too high for casting the alloy and fabricating the fuel and 3) introduces properties to inhibit fuel/cladding interdiffusion.

Figure 4:
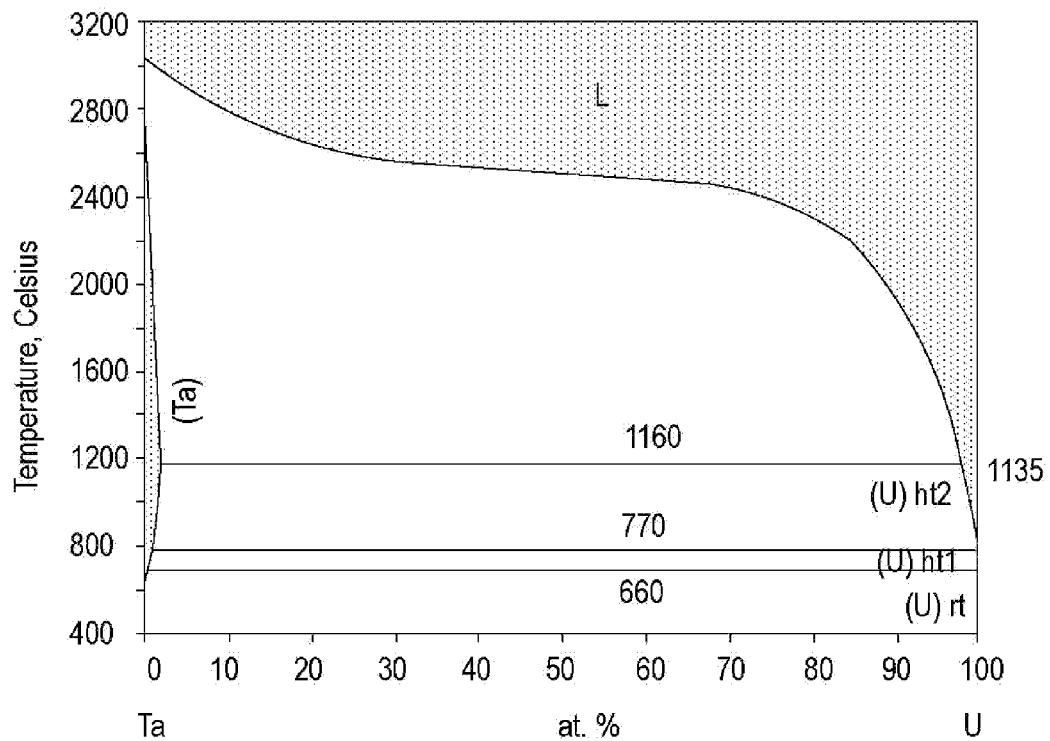
FIG. 4 is a phase diagram of the U—Ta system.
Figure 5:
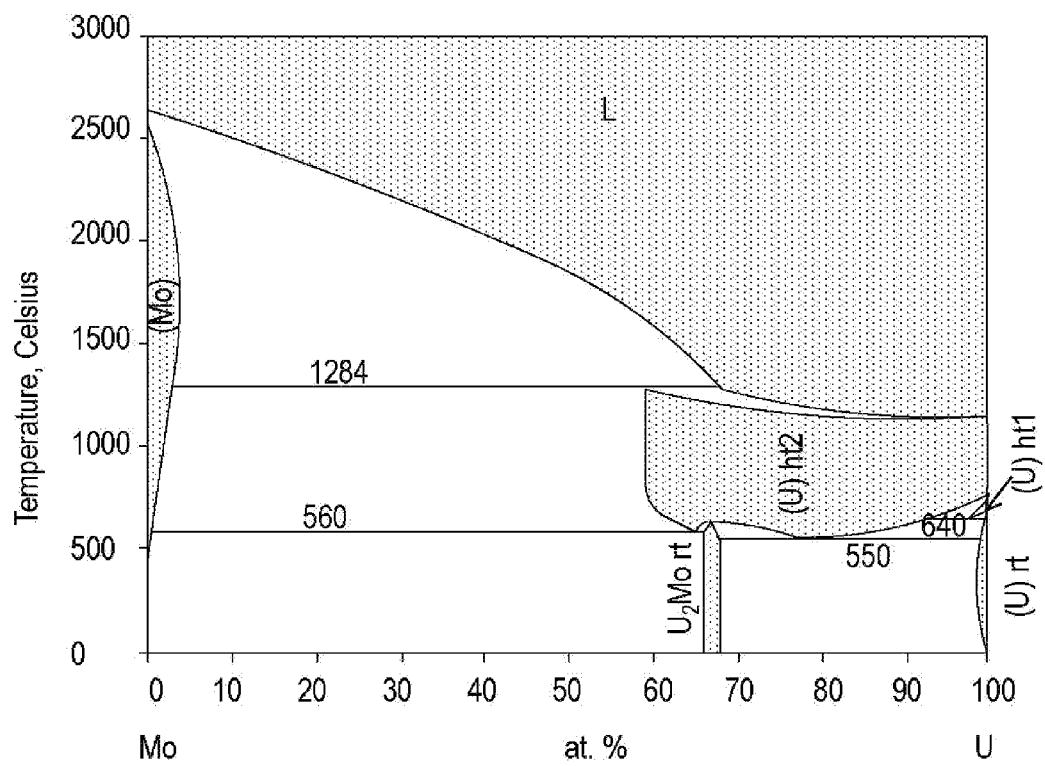
FIG. 5 is a phase diagram of the U—Mo system across a wide range of U content.

U-10Mo is a basis for a new ternary alloy U—Mo-M, in which an alloy with M is to be prepared that increases the solidus temperature. Analysis of existing phase diagrams shows that W and Ta alloy additions are interesting for three reasons: 1) W and Ta are bcc metals at room temperature, which should favor a lower onset temperature of γ-U in the ternary system; 2) the solidus properties for binary U—W and U—Ta systems (FIG. 4) are improved as compared to binary U—Mo (FIG. 5); and 3) the ternary systems (U—Mo—Ta and U—Mo—W) had been unexplored. Mo—Ta and Mo—W binary systems are expected to exhibit favorable solidus/liquidus behavior.

Figure 6:
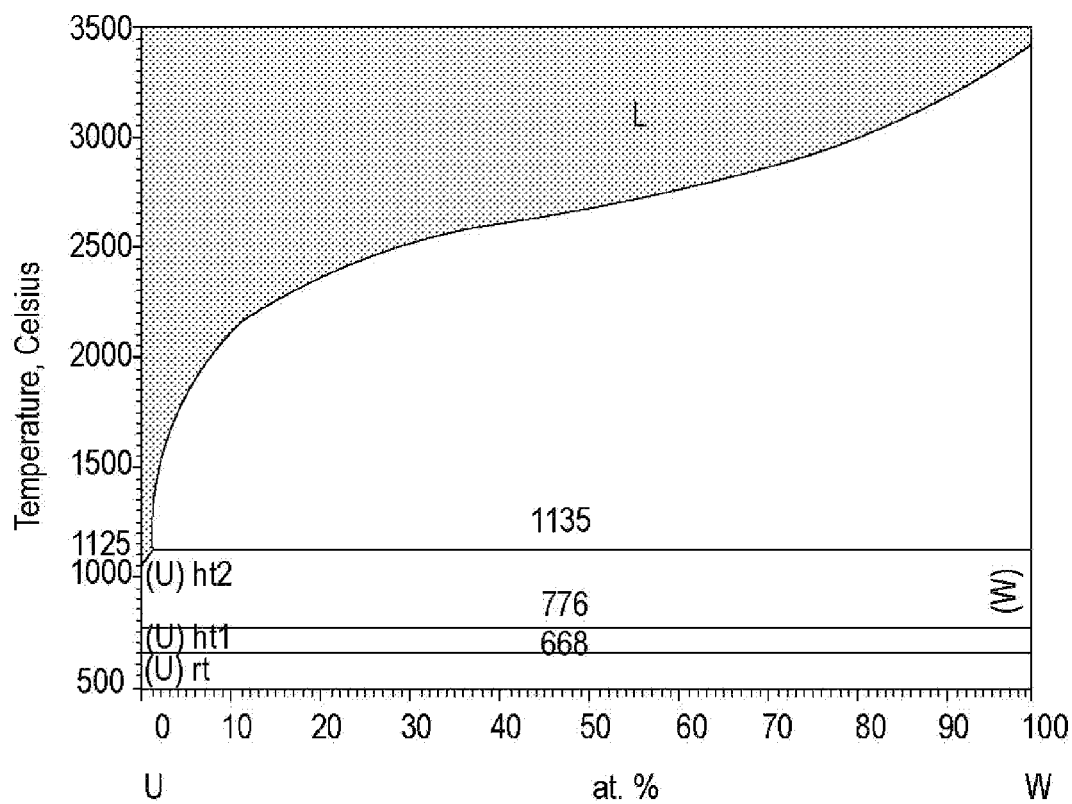
FIG. 6 is a phase diagram of the U—W system.

The U—Mo solidus is depressed in the U-rich region of the phase diagram (FIG. 4); the solidus temperature rises to 1284 degrees Celsius only after the Mo fraction reaches 37 wt. % (59 at. %). At approximately 16 wt. % Mo (32 at. %), the liquidus rises almost ideally from 1284 degrees Celsius to the melting point of Mo. This indicates a relative decrease in the cohesive energy of the alloy as compared to ideal behavior over the whole composition range. While the solidus temperature for U—Ta (FIG. 5) is also slightly depressed for high uranium fractions, the solidus increases up to 1160 degrees Celsius with only 2.3 wt % Ta and a sharp increase in liquidus ensues. This may indicate a stronger cohesive energy for the U—Ta system as compared to the U—Mo system. The U—W system gives a solidus at 1135 degrees Celsius, and the liquidus rises very rapidly beginning at 0.8 wt. % W (1 at. %) (FIG. 6). Attention is given when casting U—Mo—Ta and U—Mo—Ta systems to the rapidly rising liquidus temperatures for the binaries. Higher systems with U and Pu derive significant benefits, as Pu tends to lower the solidus and liquidus.

In at least one embodiment of a ternary alloy or composition for use in nuclear fuel, the U—Mo—W system is utilized in the range of 90U-10Mo-0W (wt. %) to 80U-10Mo-10W (wt. %). In at least one embodiment, 90U-9Mo-1W (wt. %) is utilized. In at least one embodiment of a ternary alloy or composition for use in nuclear fuel, the U—Mo—Ta system is utilized in the range of 90U-10Mo-0Ta (wt. %) to 80U-10Mo-10Ta (wt. %). In at least one embodiment, 87.3U-9.7Mo-3Ta (wt. %) is utilized.

A second candidate system involves preparing a bcc alloy of Mo—Ti—Zr that exhibits a low onset temperature for the bcc phase. This occurs below 600 degrees Celsius for the approximate composition A=50Mo-43Ti-7Zr (wt. %), or approximately equivalently $Mo_{35}Ti_{60}Zr_5$ (at. %). The bcc alloy (A) may then be combined with U up to approximately U-10A (wt. %) in order to achieve a uranium alloy with low bcc onset temperature and with an expected high solidus temperature. Though appearing complex, this system is a pseudo-binary system. The rationale is straightforward: 1) use Zr and Ti which are expected to raise the solidus in combination with Mo at the composition offering the lowest onset for bcc phase of the ternary alloy; and 2) combine with U to lower the bcc temperature even further for the quarternary system while keeping the Mo—Ti—Zr ratio fixed (otherwise the system becomes rapidly complex). The desired outcome is likely the single, simple bcc phase at reactor temperatures, and a pseudo binary alloy of U-xA is therefore an advantageous choice by analysis and design. When alloyed with uranium, the U—Mo—Ti—Zr total system is pseudo binary (U-M), and is expected to give a low bcc-phase onset temperature.

A large region of the ternary Mo—Ti—Zr system exhibits a single-phase bcc onset temperature below 600 degrees Celsius, in fact more than 25% of the ternary diagram. A bcc ternary alloy M (for example, M=50Mo-43Ti-7Zr in wt. %) may therefore be combined with uranium up to approximately U-10M (wt. %) in order to achieve a uranium alloy with the desired low bcc onset temperature and higher solidus temperature.

FIG. 7 is an isothermal ternary phase diagram of the Mo—Ti—Zr system taken at about 600 degrees Celsius. The diagram has three axes representing respective atomic percentages (at. %) for molybdenum (Mo), titanium (Ti) and zirconium (Zr). Any ternary mixture of Mo, Ti and Zr can be represented as a point within a triangular zone between the three axes. Pure Mo is represented as a corner of the triangular zone at 100 atomic percent. Similarly, pure Zr and pure Ti is represented respective 100 at. % corners. Any ternary mixture of Mo, Ti and Zr can be indicated by specifying respective atomic percentages for Mo, Ti and Zr, such that the sum of the percentages is one hundred percent. For example, a mixture having Ti and Zr in equal atom counts, and twice as many atoms of Mo as either Ti or Zr, can be indicated as $Mo_{50}Ti_{25}Zr_{25}$ (at. %). Weight percentages (wt. %) corresponding to atomic percentages (at. %) can be calculated by considering atomic masses.

A first exemplary alloy or mixture, quantified in Table 2 and indicated in FIG. 7 as composition A, can be quantified as either $Mo_{35}Ti_{60}Zr_5$ (at. %) or 50Mo-43Ti-7Zr (wt. %) without ambiguity. A second exemplary alloy or mixture, quantified in Table 2 and indicated in FIG. 7 as composition B, can be quantified as either $Mo_{15}Ti_{70}Zr_{15}$ (at. %) or 23.4Mo-54.4Ti-22.2Zr (wt. %). These exemplary compositions may be used in U-M alloys, for example, in the 5-10 wt. % M range for lowered γ-U phase onset. Other compositions within the single-phase bcc region of FIG. 7 may be used also. For example, higher Zr compositions, two of which are particularly plotted as additional points within the single-phase bcc region of FIG. 7, may be used in U-M alloys for lowered γ-U phase onset. COMP. A and COMP. B of Table 2 are particular embodiments of additives (M) in U-xM, U—Pu-xM and Actinide-xM systems, where x ranges from small values to approximately 10 (wt. %). For example, these systems at 3%, 6% and 10% M content by weight are particularly considered embodiments. Further compositions are warranted in systems where eutectoid temperature is indicated in $0 \le x \le 10$. Even further compositions are warranted in systems up to x=20 (wt. %) where a eutectoid minimum is indicated but not found at 10 wt. % W, and solidus/liquidus temperatures are not too high (1200/1350 degrees Celsius, for example).

TABLE 2

| SPECIES | COMP. A | COMP. A | COMP. B | COMP. B |
|---|---|---|---|---|
| Mo | 35 at. % | 50 wt % | 15 at. % | 23.4 wt.% |
| Ti | 60 at. % | 43 wt % | 70 at. % | 54.4 wt. % |
| Zr | 5 at. % | 7 wt % | 15 at. % | 22.2 wt. % |

Furthermore, exemplary Actinide-(Mo—Ti—Zr), Actinide-(Mo—W), Actinide-(Mo—Ta), and Actinide-(Mo—Ti) systems according to embodiments herein include, but are not limited to, compositions: preferably at least approximately 80% Actinide content by weight; more preferably at least approximately 85% Actinide content by weight; even more preferably at least approximately 90% Actinide content by weight; and no greater than approximately 97% Actinide content by weight.

Moreover, niobium (Nb) is included in fuel-metal and metal compositions as an alloying agent in some embodiments. For example, Nb can be added in small quantities, such as approximately 0.5% and 2.0% by weight of the metal or fuel-metal composition. Lanthanide fission products in metallic fuels interact with steel claddings, and the resulting wastage factors into the limitation on burn up. Even though high burn ups are achieved with metallic fuels, the chemical stabilization of the lanthanides against fuel/cladding chemical interaction (FCCI) is expected to enhance fuel performance to higher burnup. Lanthanides can migrate extensively to the fuel slug periphery whereupon fuel expansion permits formation of low melting eutectic systems, such as Ce—Ni and Ce—Fe. To address lanthanide-based FCCI, niobium can be added to cladding materials, cladding coatings, liners between fuel and cladding, and fuel additives to stabilize the lanthanides as intermetallic compounds. As intermetallic compounds, the lanthanides may be immobilized in the fuel matrix, or, if not immobilized, may show lesser reactivity with cladding.

Attention is to be directed toward the bcc-phase onset temperature and solidus temperature with inclusion of additives such as platinum, niobium, or chromium, to reduce deformations upon thermal cycling at the α-β transformation temperature. It is worth noting that palladium is chemically similar to platinum, with comparable atomic radius, and may work as platinum does on mitigating deformation, and it does mitigate lanthanide-based FCCI. Platinum, however, has much higher solubility in α and β uranium than palladium does, which may be the reason for the influence of platinum on curbing deformation during repeated α-β phase transformations.

A brief summary of electrorefining is given here to help provide further discussion of the impacts on fuel performance and processing of the new alloy developments. Chopped segments of spent fuel are loaded into anode baskets that are then immersed into molten LiCl—KCl (eutectic ratio) at 500 degrees Celsius. A steel mandrel is used as the cathode during electrorefining to collect the purified uranium metal dendrites. At the anode, uranium in the spent fuel is oxidized into the molten salt as $U^{+3}$ and, while at the cathode, is reduced to uranium metal. Active metal fission products (such as lanthanides) accumulate in the molten LiCl—KCl as their respective chlorides (e.g., LaCl). Metal fission products more noble (less electropositive) than uranium (such as Tc, Ru) are either retained in the cladding hull segments or released into the electrorefiner where they adhere to vessel components or dissolve in liquid metals. Alloy components such as zirconium can be partially oxidized to deposit with the purified uranium, or can suffer a similar fate as the more noble metal fission products (such as Tc, Ru).

Regarding expected electrorefining behavior for new alloy components, Table 3 lists an abbreviated electromotive force (emf) series for fuel components in LiCl—KO eutectic at 450 degrees Celsius. For this series, neodymium is the most electropositive and ruthenium is the least electropositive. Proceeding down the table, the relative stability of the chlorides is ranked, with $NdCl_3$ being the most stable chloride (with $NdCl_3$ stability comparable to the chlorides of the other lanthanide fission products). On account of the stability of the lanthanide chlorides, these fission products accumulate in the molten LiCl—KCl salt, which contributes to their disposition in the ceramic waste form. The relative abundance of chemical species present in irradiated fuel has been observed, for example, at the Experimental Breeder Reactor—II (EBR-II) of Argonne National Laboratory.

The electrorefining behavior of zirconium in the fuel alloy exhibits oxidation, deposition with uranium at the cathode, and spurious deposition of zirconium on the exterior of the cladding. Depending on the process conditions, it is possible to electrochemically oxidize zirconium from the steel cladding and the extent of oxidation can be controlled. Since the stability of the chlorides of titanium is comparable to the chlorides of zirconium in this system, the electrorefining characteristic of titanium is expected to be comparable to zirconium, and likewise controllable.

The emf for ruthenium is comparable to those for molybdenum and palladium. Ruthenium can be retained with the cladding, and it can contaminate electrodeposited uranium as a consequence of convection of fine particulates. However, palladium should be chemically bound with the lanthanides, and the lanthanides should be more difficult to oxidize to their respective chlorides, by the lowering of their free energy upon formation of the intermetallic compound. This could benefit the ceramic-salt waste streams, as the lanthanides would not accumulate in the eutectic LiCl—KCl as rapidly as compared to absence of palladium.

Molybdenum will not electrochemically oxidize in the electrorefining process, and its presence is expected to aid the retention of zirconium and titanium. Alloy composition can include unirradiated depleted uranium alloys. The presence of molybdenum could slow down and impede the electrochemical oxidation of the last few percentage points of uranium, as zirconium does.

TABLE 3

| OXIDATION/REDUCTION COUPLE | $E°_M$ (Pt)(V) | $E°_m$ (Ag)(V) |
|---|---|---|
| Nd (III)/Nd (0) | −2.819 | −2.097 |
| U (III)/U (0) | −2.218 | −1.496 |
| U (IV)/U (0) | −1.950 | −1.230 |
| Zr (IV)/Zr (II) | −1.864 | −1.153 |
| Zr (IV)/Zr (0) | −1.807 | −1.088 |
| Zr (II)/Zr (0) | −1.75 | −1.02 |
| Ti (II)/Ti (0) | −1.74 | −1.01 |
| Ti (III) I Ti (0) | −1.60 | −0.88 |
| Ti (IV)/Ti (0) | −1.486 | −0.767 |
| Cr (D)/Cr (0) | −1.425 | −0.698 |
| Ti (III)/Ti (II) | −1.32 | −0.61 |
| In (I)/In (0) | −1.210 | −0.467 |
| Fe (II)/Fe (0) | −1.172 | −0.445 |
| Mo (III)/Mo (0) | −0.603 | +0.119 |
| Pd (II)/Pd (0) | −0.214 | +0.513 |
| Ru (III)/Ru (0) | −0.107 | +0.615 |

Impacts on fuel fabrication are also minimal. Casting should be little affected, based on the experience with the binary systems. It may be necessary to perform some pre-alloying step to produce a more homogeneous alloy composition. Thermal conductivity can be expected to be comparable or better than U-10Zr, because of the presence of molybdenum. Likewise, fuel swelling and constituent redistribution are expected to be improved compared to U-10Zr, because of the sizable increase in the fraction of cubic phase. For TRU burning fuels, the safety margin toward fuel melting will be increased compared to a U—Mo alloy with TRUs. The fast reactor neutronics penalty for molybdenum is substantial in comparison to zirconium (but less than a factor of ten); however, the change in reactivity can be accommodated in a fast reactor with core size and fissile content, for example U-xMo, with x=7-10% by weight. The cross section for titanium in fast reactors is comparable to zirconium, and the titanium cross section is less than zirconium for most of the spectrum between 0.2 and 3 MeV.

The impact on the waste streams should be minimal. The waste stream already needs to accommodate Tc-99, because U-10Zr at 8 atom percent burn up contains 0.17 wt. % (0.34 atom %) technetium. The Tc-99 generated from Mo-98 in the fuel alloy therefore does not introduce a new waste stream. Otherwise, the titanium and molybdenum should behave similar to zirconium; electro refining with a U-M alloy is discussed in the following.

Reference is now made toward superior uranium alloys with regard to alloy solidus transition temperature and the transition temperature of the body centered cubic γ-phase for improved performance and safety margin. The alloy of interest includes uranium and various concentrations of M, composed as U-xM, where M is 50Mo-43Ti-7Zr (wt. %). Particular examples include x=5, 7.5, 10, 12.5, and 15. Increasing the concentration of M decreases the temperature of the eutectoid and increases the temperature of the solidus onset up to approximately 10 wt. % M. Above x=10, the eutectoid onset, solvus onset, and solidus reach a plateau in temperature.

According to collected differential scanning calorimetry (DSC) data, increasing the alloy addition of M in uranium increases the solidus transition temperature and decreases the γ-phase transition temperature with increasing alloy addition up to approximately 10 wt. % M. Environmental scanning electron microscopy (ESEM) images coupled with energy dispersive X-ray (EDX) analysis, indicate that a feature consisting of a proeutectoidal precipitation and divorced eutectoid, primarily of titanium and zirconium, is forming during the cooling through γ-α phase transition. The molybdenum addition is uniformly distributed in the uranium and little if any molybdenum is present in the feature consisting of proeutectoidal precipitation and divorced eutectoid. See table 4 for DSC results.

TABLE 4

| Alloy Composition | Solidus ° C. | Solvus ° C. | Eutectoid ° C. |
|---|---|---|---|
| U-15 M (wt. %) | 1228.3 ± 9.1 | 682.2 ± 8.9 | 633.0 ± 2.0 |
| U-12.5 M (wt. %) | 1226.7 ± 7.9 | 694.7 ± 10.1 | 626.0 ± 9.0 |
| U-10 M (wt. %) | 1220.9 ± 16.2 | 681.6 ± 22.0 | 627.7 ± 7.4 |
| U-7.5 M (wt. %) | 1186.7 ± 6.8 | 677.6 ± 2.9 | 631.9 ± 5.3 |
| U-5 M (wt. %) | 1173.6 ± 3.5 | 687.6 ± 6.3 | 641.6 ± 2.9 |
| Uranium | 1135 ± 0 | 781 ± 0 | 670.6 ± 0 |

Coring, segregation, and cooling were found to occur. X-ray diffraction (XRD) analysis was used for qualitative phase identification. The ESEM results illustrate a proeutectoidal precipitation and divorced eutectoid bounding prior γ-phase grains. EDX results indicate proeutectoidal precipitation and divorced eutectoid in a Zr,Ti-rich phase and proeutectoidal precipitation and divorced eutectoid composed of a uranium and molybdenum rich α-phase. In addition, the EDX results suggest that coring exists because of oscillations in the number of counts for the alloy constituents. Optical microscopy was used as an additional verification of phases using both chemical and electrolytic etch techniques. The presence or absence of phases within each micrograph suggest a cooling and solidification history unique to the composition of the casting. The DSC results were used to determine transition temperatures for each alloy. The DSC results verified the expansion of the γ-phase field and gave specific temperatures to suggest reactions using the results from XRD analysis and optical microscopy coupled with transition temperatures.

The as-cast alloys may produce a range of composition dependent transition temperatures during phase transformation specifically at the transition temperature of the γ-phase and the transition temperature of the solvus. A range in transition temperatures is illustrated by the error estimations on the DSC analysis results in Table 4. The results of the DSC analysis suggest that with increasing M, the transition temperatures from γ-to-α+$U_2$Ti(Zr) phases decrease from unalloyed uranium transition temperature for the α-to-β at 670 degrees Celsius and plateau at about 640 degrees Celsius. The transition temperature of γ-solidus increases from about 1135 degrees Celsius and plateaus at about 1225 degrees Celsius. The solvus temperature also decreased from 781 to about 680 degrees Celsius. Generally, the γ-phase field broadens with increasing alloy addition of M. A transition temperature found at 670 degrees Celsius may indicate the temperature region where γ-to-$U_2$Ti(Zr)+α occurs for alloys containing 10 wt. % M and above. Lower concentrations of M may transition from the γ-phase by γ-to-$U_2$Ti(Zr)+β. A significance of a γ transition temperature found at 640° C. is that the temperature is similar to that of the two-phase region located in the uranium-molybdenum binary in FIG. 5. The two-phase region consists of the γ+α phases and is not a eutectoid transition. The transition temperature corresponds to a eutectoid transition temperature where the reaction is γ-to-α-$U_2$Mo. The γ-phase transition temperature at 640 degrees Celsius indicates that the eutectoid temperature relative to the uranium-molybdenum system has increased with the addition of titanium and zirconium to the system. The solvus temperature relative to the molybdenum-titanium system has also increased roughly 40 degrees Celsius. The greatest expansion of the γ-field is demonstrated by uranium-10M alloy where M is 50Mo-43Ti-7Zr (wt. %)

Figure 8:
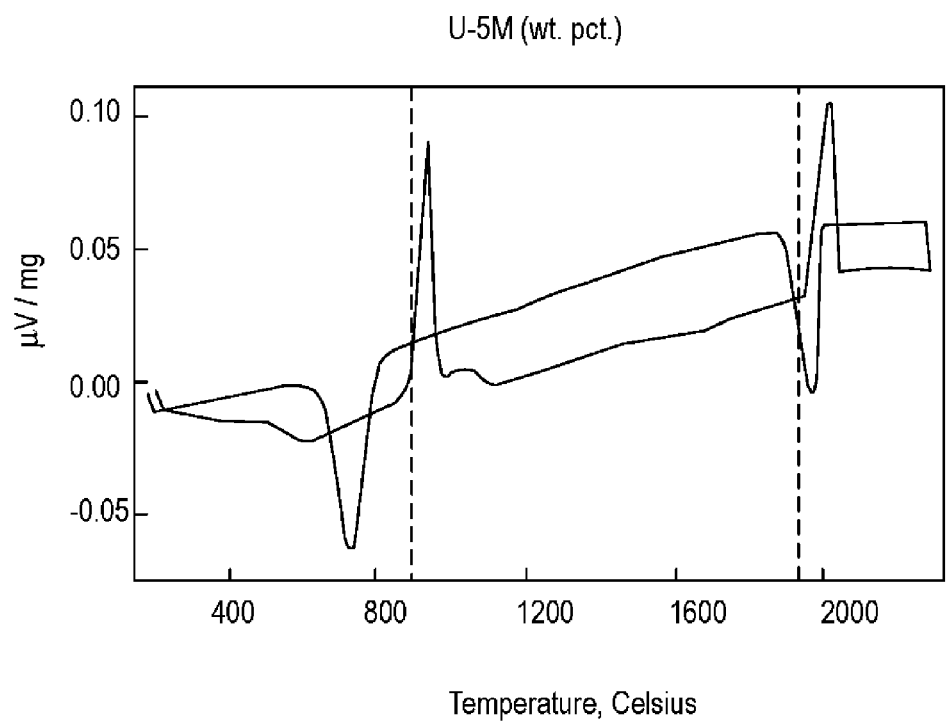
FIG. 8 is a differential scanning calorimetry (DSC) plot of 50Mo-43Ti-7Zr in combination with uranium.

The results indicate that γ-phase field broadens with the addition of M to uranium as a solute. In addition, the solvus temperature decreased after the addition of 5 wt. % M but transition temperature plateaued with increasing addition of M. The solvus temperature currently has the most variance of the transition temperatures because of peak overlap from the end of the eutectoid heating curve peak and the beginning of the solvus heating curve peak (FIG. 8). The temperatures have the largest variation in transitions temperatures because there are two possible reactions occurring that may obscure the solvus onset temperature ranging between 730 to 668 degrees Celsius. The first possible reaction is the transition from γ-to-β+$U_2$Ti(Zr) first observed at 700 degrees Celsius. The second reaction is γ-to-α+$U_2$Ti(Zr) and is first observed at 662 degrees Celsius. In addition, added degrees of freedom associated with the phase rule for systems with greater than two components indicate a broadening of equilibrium lines. The broadening of equilibrium lines over a range of alloy additions is verified by DSC analysis.

U—Mo based fuel alloys are of interest because they have a low onset temperature for the body-centered cubic γ-phase. The bcc phase expands isotropically with increasing temperature. Anisotropic fuel swelling was an early metallic fuel performance issue and was mitigated through alloy additions that stabilized higher symmetry fuel phases. The DSC data suggest that increasing M broadens the transition temperature bounding the γ-phase field. X-ray diffraction data indicates that addition of M greater than 5 wt. % suppresses the transition to the β-phase field. The γ-phase field is broadened by lowering the α-to-γ transformation temperature and increasing the γ-to-solidus transformation temperature. The ternary diagram shown in FIG. 6 indicates that alloying with M would lower the γ-phase transition temperature relative to pure uranium because of the presence of the bcc phase at 600 degrees Celsius. When the data is compared to the uranium-molybdenum binary diagram, the eutectoid temperature relative to FIG. 5 at 550 degrees Celsius has risen to roughly 640 degrees Celsius. The maximum spread of the γ-phase field is 600 degrees Celsius at 12.5 wt. % M. Metastability was not observed based on DSC results but significant γ-phase uranium was identified using X-ray diffraction analysis.

Figure 9:
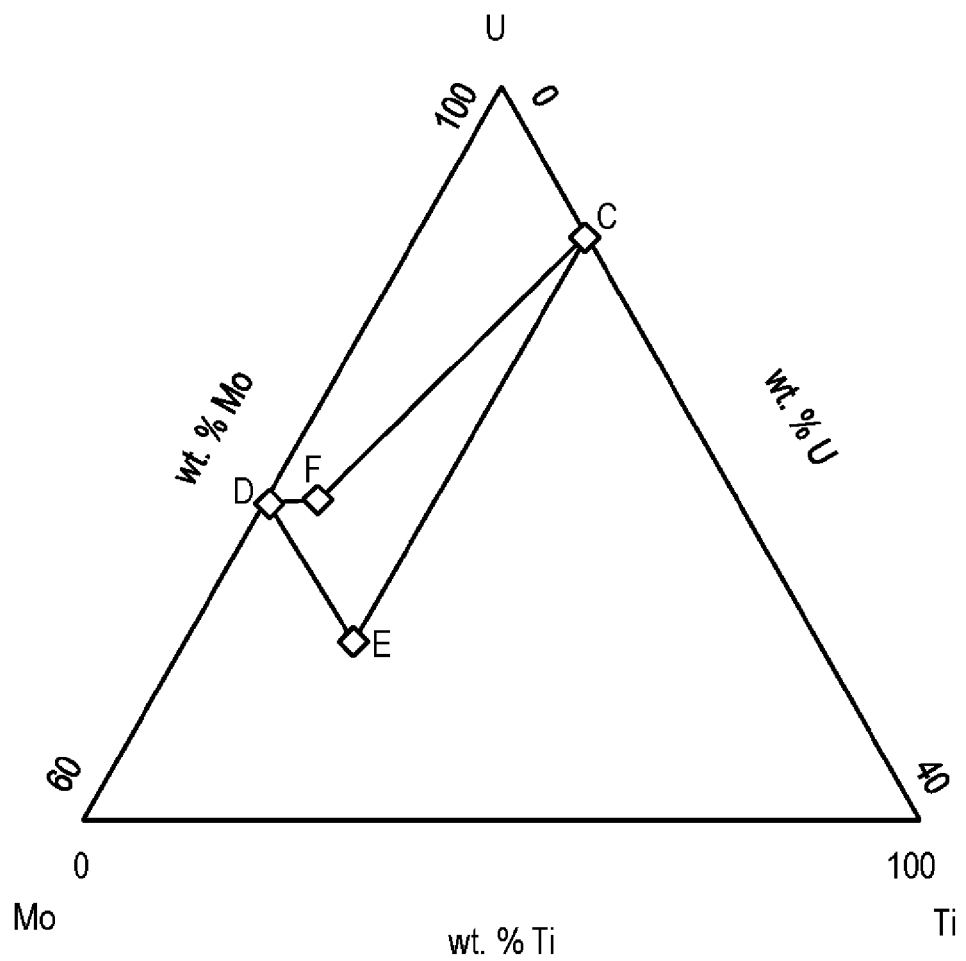
FIG. 9 is a ternary diagram of the U—Mo—Ti system, in which a region of fuel mixtures according to various embodiments is shown.

A third candidate system is the U—Mo—Ti system. A particular region of interest within the ternary diagram of the U—Mo—Ti system is represented in FIG. 9. Compositions specified as of particular interest according to embodiments described herein fall approximately within a region defined by four compositions C, D, E and F, which are selected as four corners of a region of interest as shown in FIG. 9. Composition C is approximately 98U-2Ti (wt. %). Composition D is approximately 90U-10Mo (wt. %). Composition E is approximately 87U-11Mo-2Ti (wt. %). Composition F is approximately 90U-9Mo-1Ti (wt. %). These alloys were chosen as the corners of a region of interest within the ternary diagram of the U—Mo—Ti system because of their eutectoid compositions that offer the low bcc-phase onset temperatures found in the binary systems. A lower bcc onset temperature may exist within the specified region of interest, with the corners of the phase field posing the "high" temperature boundaries. These U—Mo—Ti species are given in Table 5.

TABLE 5

| SPECIES | COMP. C | COMP. D | COMP. E | COMP. F |
| --- | --- | --- | --- | --- |
| U | 98 wt. % | 90 wt. % | 87 wt. % | 90 wt. % |
|  | (92.5 at. %) | (78 at. %) | (70.5 at. %) | (78 at. %) |
| Mo | 0 % | 10 wt. % | 11 wt. % | 9 wt. % |
|  |  | (22 at. %) | (22 at. %) | (19.4 at. %) |
| Ti | 2 wt. % | 0 % | 2 wt. % | 1 wt. % |
|  | (7.5 at. %) |  | (7.5 at. %) | (2.6 at. %) |

In at least one embodiment of a composition for use in nuclear fuel, the U—Mo—Ti system is utilized approximately as 88.3U-3.5Mo-1.8Ti (wt. %). In at least one other embodiment of a composition for use in nuclear fuel, the U—Mo—Ti system is utilized approximately as 92U-6.9Mo-1.1Ti (wt. %).

Figure 10:
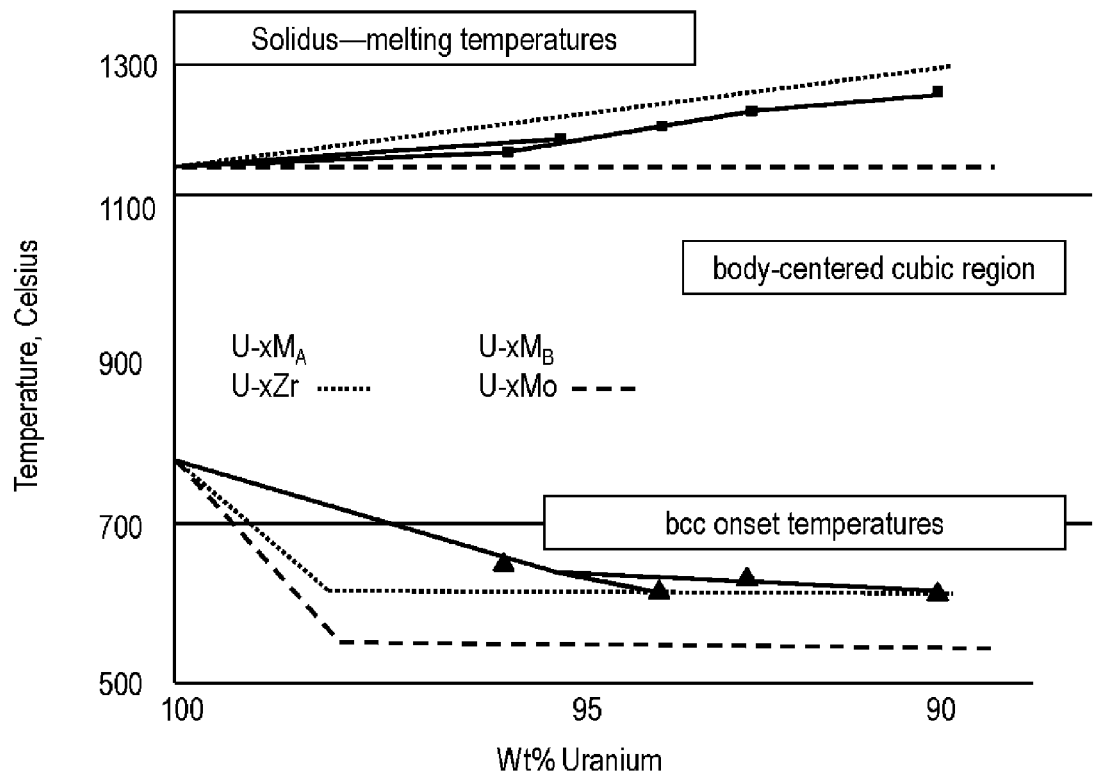
FIG. 10 is a plot that provides approximate solidus temperatures for two pseudo-binary systems, U-(50Mo-43Ti-7Zr) and U-(73Mo-27Ti)

FIG. 10 summarizes the results for two pseudo-binary systems, U-x$M_A$ and U-x$M_B$, where x varies up to 15 weight percent. $M_A$ designates composition A (Table 2), the constant weight ratio 50Mo-43Ti-7Zr. $M_B$ designates the constant weight ratio 73Mo-27Ti. It may be noted that both systems offer increased melting temperature over the U—Mo system. However, the U-x$M_A$ does not appear to offer the desired benefit for lowering the bcc onset temperature substantially in comparison to U—Zr. The U-x$M_B$ system appears promising because the minimum onset temperature has not been observed yet, and the curve has not leveled off. Higher concentrations of $M_B$ (higher x in U-x$M_B$) likely exhibit lower onset temperatures, the minimum of which may correspond to an advantageous U-x$M_B$ composition.

Various embodiments of alloys and mixtures described herein can be made by, for example, vacuum induction melting, vacuum arc remelting, and cold crucible melting without limiting processing to these examples. The target alloy composition can be prepared by melting the individual elements together. The target alloy composition can be prepared by making pre-alloys. For example, first a "pre-alloy" of U-10Mo (wt. %) can be prepared, and then, in a separate heating, additional uranium, molybdenum, titanium, zirconium and/or other species described herein can be added to reach the desired composition. More than one pre-alloy may be used to prepare the final alloy. For example, a pre-alloy of U—Mo might be combined with a pre-alloy of Mo—Ti—Zr, with compositions chosen such that the desired final alloy composition is reached during the final melting operation.

In vacuum induction melting, material is melted by eddy currents in an evacuated induction furnace. In vacuum arc remelting (VAR), the material to be melted is used as one of two electrodes across which a currents arcs, causing melting of the material within a cooled crucible held under vacuum. In cold-crucible melting, an induction coil surrounds a crucible containing the material to be melted. The crucible has, in its construction, electrically-isolated water-cooled tubing. When an electric current passes through the induction coil, the material contained by the crucible is heated inductively. The water-cooled tubing freezes or maintains a solid outer shell of the material within the crucible, with a liquified melt contained within the cooled shell. Thus, high temperatures can be reached while maintaining the melt in a solid containment shell that isolates the crucible from the melt. In cold-crucible melting, direct contact of current carrying electrodes with the melt is avoided.

In at least one embodiment of an alloy with uranium as the only actinide, the uranium composition ranges from 85 to 95 weight percent, with the balance taken by molybdenum, titanium, and zirconium. In another embodiment, molybdenum and titanium are alloyed with uranium (U—Mo—Ti), of which several examples are specified by wt. % herein. Other exemplary embodiments include U—Mo—W and U—Mo—Ta. In other embodiment, a small amount of niobium may be used as a minor alloying agent (e.g. 2 wt. % Nb). In still other embodiments, an alloy contains uranium and/or other actinides, such as plutonium and uranium. In at least one embodiment, an alloy contains uranium, plutonium and the minor actinides neptunium and americium. In some embodiments in which the only actinide present is uranium, the desired solidus temperature is in excess of 1200 degrees Celsius. The desired liquidus temperature (the temperature of complete melting, or temperature above which only liquid alloy is present) is below 1400, or preferably below 1350 degrees Celsius. For at least one solid alloy, at temperatures below the solidus temperature, it is desired that the alloy is single-phase, body-centered cubic (bcc) structure, also known as the γ phase. It is further desired that the single-phase behavior is retained from the solidus temperature down to 600 degrees Celsius, preferably to 550 degrees, and more preferably to 500 degrees Celsius.

In other embodiments, other actinides are present in alloys in addition to uranium, such as plutonium or neptunium. In some such embodiments, both the solidus and liquidus temperatures of the alloy are less than temperatures of uranium-based single-actinide alloys. For example, solidus is preferably above 1150 degrees Celsius for the multi-actinide alloys. As with single-actinide alloys, a single-phase bcc structure is desired in multi-actinide alloys.

TABLE 6

| SPECIES | I | II | III | IV | V | VI | VII | VIII | IX | X | XI |
|---|---|---|---|---|---|---|---|---|---|---|---|
| U | 90.0 | 85.0 | 88.3 | 92.0 | 89.0 | 67.0 | 69.0 | 90 | 87.3 | 90 | 67.5 |
| Mo | 5.0 | 3.5 | 9.82 | 6.9 | 3.5 | 5.0 | 9.4 | 9.0 | 9.7 | 7 | 10 |
| Ti | 4.3 | 8.2 | 1.8 | 1.1 | 8.2 | 4.3 | 0.6 | | | | |
| Zr | 0.7 | 3.3 | | | 3.3 | 0.7 | | | | | |
| Nb | | | | 1.0 | | 2.0 | | | | 0.5 | |
| W | | | | | | | | 1.0 | | 2.5 | 2.5 |
| Ta | | | | | | | | | 3.0 | | |
| Pu | | | | | | 19.0 | 15.0 | | | | 15 |
| Np | | | | | | | 2.5 | 3.0 | | | 3 |
| Am | | | | | | | 1.5 | 1.0 | | | 2 |

In Table 6, in which wt. % values are given, species I corresponds to composition A of Table 2, combined with uranium in a 90U-10M (wt. %) fuel composition in which M=50Mo-43Ti-7Zr (wt. %). Species II corresponds to composition B of Table 2, combined with uranium in a 90U-10M (wt. %) fuel composition in which approximately M=23.4Mo-54.4Ti-22.2Zr (wt. %). Species III and IV are U—Mo—Ti fuel mixtures as specified. Species V and VI are fuel mixtures of the Mo—Ti—Zr system, in which species V includes uranium as fuel and niobium (Nb) as an alloying agent, and species VI includes uranium and several additional transuranic elements. Species VII is a fuel mixture of the U—Mo—Ti—Zr system, in which niobium and several additional transuranic elements are included. Species VIII and IX and X and XI are fuel alloys within the U—Mo—W and U—Mo—Ta systems. In all these systems given as non-limiting examples, a fuel alloy including uranium and other metals provide a basis for an alloy with elevated solidus and reduced gamma onset temperature, compared to U—Zr alloys, that also tolerates addition of transuranics so that the melting temperature (solidus) is not depressed substantially below 1150 C, and preferably not below 1200 C.

The above U-M, U—Pu-M, M systems can be analyzed, for example, by melting and casting the alloys into buttons or slugs and conducting testing to determine such properties as bcc-phase onset, solidus and liquidus temperatures. Exemplary analysis methods include, but are not limited to: differential scanning calorimetry; differential thermal analysis; and/or high-temperature methods such as dilatometry and thermal diffusivity testing. Quenching can be applied to isolate high-temperature phases, and long-term annealing can be applied for grain growth and traditional metallographic examination. Alloys can be characterized for microstructure (e.g., SEM) and for phase content (XRD).

Figure 11:
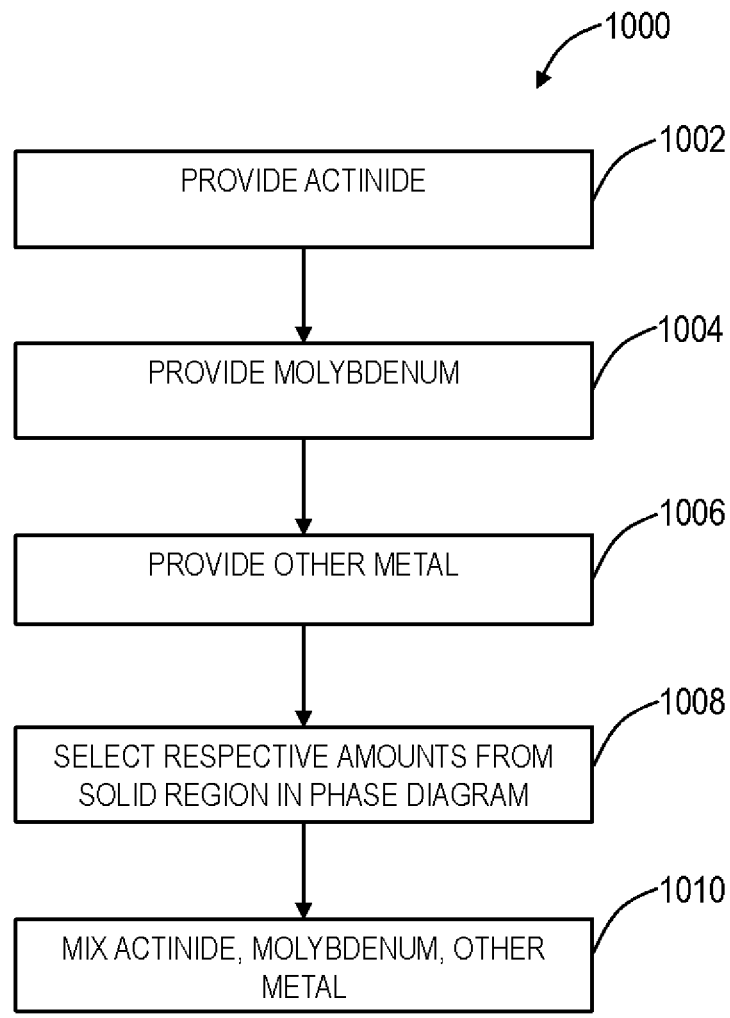
FIG. 11 is a flowchart diagramming a method of making a nuclear fission fuel according to various embodiments.

According to various embodiments, a method of making nuclear fission fuel is diagrammed as a flowchart in FIG. 11.

The method 1000 includes at least the processes illustrated. In step 1002, at least one naturally fissioning actinide is provided. For example, U and U—Pu are provided in respective embodiments. Additional actinides and transuranic elements may be provided as well. For example, see species VI and VII in Table 6. In step 1004, molybdenum is provided. In step 1006, a metal other than molybdenum is provided. For example, various U—Mo—Ta, U—Mo—W, U—Mo—Ti and Mo—Ti—Zr systems are described herein. In step 1008, respective amounts of the naturally fissioning actinide, the molybdenum, and the metal are selected. In step 1010, a total weight of a fuel mixture is prepared by mixing the selected respective amounts of the naturally fissioning actinide, the molybdenum, and the metal. With regard again to step 1008, in at least one embodiment, the respective amounts are selected in a body-centered cubic solid phase region of a phase diagram of the fuel mixture. In at least one other embodiment, the respective amounts are selected in a solid phase region, such as body-centered cubic solid phase region, of a phase diagram of a composition including molybdenum and the other metal, in which the composition may or may not include an actinide.

Figure 12:
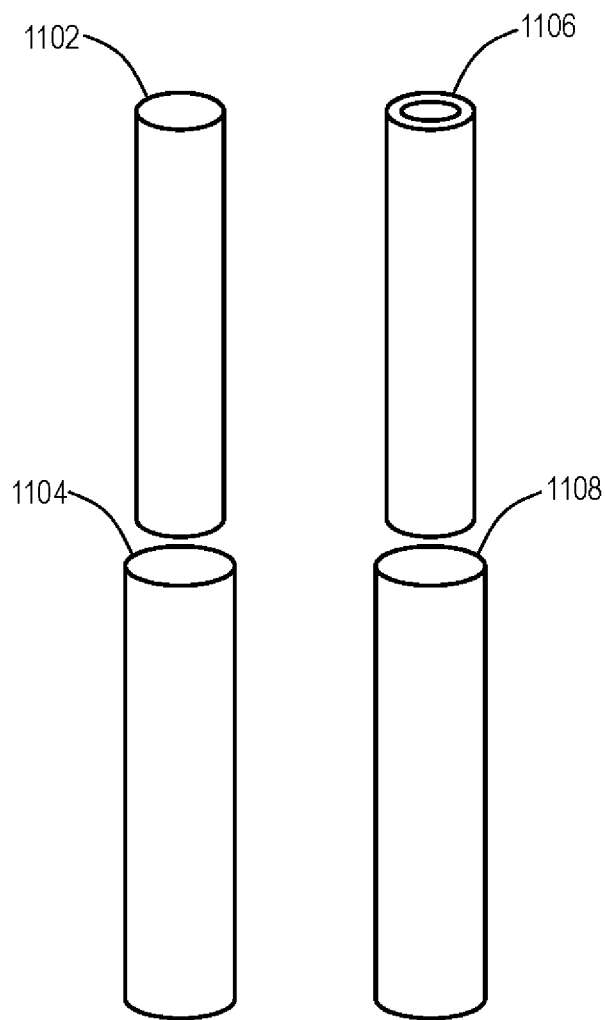
FIG. 12 is an exploded perspective view of two embodiments of nuclear fuel slugs and their claddings.

Nuclear fuel rods, slugs, and claddings have been mentioned in the above descriptions. For exemplary purposes, two embodiments of nuclear fuel slugs and their claddings in exploded perspective view are illustrated in FIG. 12. A cylindrical fuel slug 1102 composed of a fission fuel mixture according to one or more embodiments described herein and a corresponding cladding cylinder 1104 are shown. An annular fuel slug 106 composed of a fission fuel mixture according to one or more embodiments described herein and a corresponding cladding cylinder 1108 are also shown. A nuclear fuel rod or pin is prepared from either embodiment illustrated in FIG. 12 by insertion of either slug (1102, 1106) into its corresponding cladding (1104, 1108) and sealing of the cladding to encapsulate the slug. A plenum chamber for collection of gases within the cladding, and a sodium bond for thermal conduction, may be included.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A nuclear fission fuel mixture, comprising:
at least one naturally fissioning actinide; and
a ternary metallic additive comprising:
a metal first component as a first percentage of the additive total weight;
a metal second component as a second percentage of the additive total weight;
a metal third component as a third percentage of the additive total weight, wherein the first percentage, second percentage, and third percentage sum to about one hundred percent;
wherein the first percentage, second percentage, and third percentage are selected in a solid phase region of an isothermal ternary phase diagram of the ternary metallic additive taken at a temperature between about 450 Celsius degrees and about 700 Celsius degrees.

2. The nuclear fission fuel mixture of claim 1, wherein the first component is molybdenum, the second component is titanium, and the third component is zirconium.

3. The nuclear fission fuel mixture of claim 2, wherein the ternary metallic additive comprises:
molybdenum in a range from about 18 percent to about 55 percent of the additive total weight;
titanium in a range from about 38 percent to about 59 percent of the additive total weight; and
zirconium in a range from about 2 percent to about 27 percent of the additive total weight.

4. The nuclear fission fuel mixture of claim 2, wherein the ternary metallic additive comprises:
molybdenum in a range from about 45 percent to about 55 percent of the additive total weight;
titanium in a range from about 38 percent to about 48 percent of the additive total weight; and
zirconium in a range from about 2 percent to about 12 percent of the additive total weight.

5. The nuclear fission fuel mixture of claim 2, wherein the ternary metallic additive comprises:
molybdenum in a range from about 18 percent to about 28 percent of the additive total weight;
titanium in a range from about 48 percent to about 58 percent of the additive total weight; and
zirconium in a range from about 17 percent to about 27 percent of the additive total weight.

6. The nuclear fission fuel mixture of claim 2, further comprising niobium, wherein the nuclear fission fuel mixture contains less niobium by weight than any one of molybdenum, titanium, and zirconium.

7. The nuclear fission fuel mixture of claim 1, wherein the naturally fissioning actinide is uranium.

8. The nuclear fission fuel mixture of claim 7, further comprising plutonium.

9. The nuclear fission fuel mixture of claim 1, wherein the first component is molybdenum and the second component is tungsten.

10. The nuclear fission fuel mixture of claim 1, wherein the first component is molybdenum and the second component is tantalum.

11. A nuclear fission fuel mixture for use in a fission reactor in which the nuclear fission fuel mixture remains solid under all anticipated operating conditions, the nuclear fission fuel mixture comprising:
at least one naturally fissioning actinide as a first percentage of the total weight of the nuclear fission fuel mixture;
molybdenum as a second percentage of the total weight of the nuclear fission fuel mixture; and
one or more metals other than molybdenum as a third percentage of the total weight of the nuclear fission fuel mixture,
wherein the first percentage, second percentage, and third percentage are selected such that the nuclear fission fuel mixture exhibits a solidus temperature above the likely to exceed the fuel operating temperature of a sodium cooled fast reactor.

12. The nuclear fission fuel mixture of claim 11, wherein the one or more metals comprises at least one of titanium, zirconium, tungsten, tantalum, niobium and palladium.

13. The nuclear fission fuel mixture of claim 11, wherein the at least one naturally fissioning actinide comprises at least one of uranium and plutonium.

14. The nuclear fission fuel mixture of claim 11, wherein the nuclear fission fuel mixture comprises:

uranium in a range from about 85 percent to about 99 percent of the total weight of the nuclear fission fuel mixture;

molybdenum in a range from about 1 percent to about 13 percent of the total weight of the nuclear fission fuel mixture; and titanium in a range from about 1 percent to about 4 percent of the total weight of the nuclear fission fuel mixture.

15. The nuclear fission fuel mixture of claim 11, wherein:

the first percentage, second percentage, and third percentage sum to about one hundred percent; and the first percentage is in a range of about 80 percent to about 97 percent of the total weight of the nuclear fission fuel mixture.

16. The nuclear fission fuel mixture of claim 11, wherein:

the first percentage, second percentage, and third percentage sum to about one hundred percent;

the first percentage, second percentage, and third percentage are selected in a solid phase region of an isothermal ternary phase diagram of the nuclear fission fuel mixture taken at a temperature below the upper temperature limit.

17. The nuclear fission fuel mixture of claim 11, wherein:

the first percentage, second percentage, and third percentage are selected in a triangular region of a uranium-molybdenum-titanium ternary diagram having three corners selected from a set of four points consisting of:

uranium as about 98 percent and titanium as about 2 percent of the total weight of the nuclear fission fuel mixture;

uranium as about 90 percent and molybdenum as about 10 percent of the total weight of the nuclear fission fuel mixture;

uranium as about 87 percent, molybdenum as about 11 percent, and titanium as about 2 percent of the total weight of the nuclear fission fuel mixture; and uranium as about 90 percent, molybdenum as about 9 percent, and titanium as about 1 percent of the total weight of the nuclear fission fuel mixture.

18. A method of making nuclear fission fuel, comprising:

providing at least one naturally fissioning actinide;

providing molybdenum;

providing a metal other than molybdenum; and preparing a total weight of a fuel mixture by mixing the at least one naturally fissioning actinide, the molybdenum, and the metal, the fuel mixture comprising:

the at least one naturally fissioning actinide as a first percentage of the total weight;

the molybdenum as a second percentage of the total weight; and the metal as a third percentage of the total weight, wherein the first percentage, second percentage, and third percentage are selected in a body-centered cubic solid phase region of a phase diagram of the fuel mixture.

19. The method of claim 18, wherein:

the first percentage, second percentage, and third percentage are selected in a triangular region of a uranium-molybdenum-titanium ternary diagram having three corners selected from a set of four points consisting of:

uranium as about 98 percent and titanium as about 2 percent of the total weight of the nuclear fission fuel mixture;

uranium as about 90 percent and molybdenum as about 10 percent of the total weight of the nuclear fission fuel mixture;

uranium as about 87 percent, molybdenum as about 11 percent, and titanium as about 2 percent of the total weight of the nuclear fission fuel mixture; and uranium as about 90 percent, molybdenum as about 9 percent, and titanium as about 1 percent of the total weight of the nuclear fission fuel mixture.

20. The method of claim 18, wherein the fuel mixture comprises:

the at least one naturally fissioning actinide; and a ternary metallic additive comprising:

molybdenum in a range from about 18 percent to about 55 percent of the weight of the additive;

titanium in a range from about 38 percent to about 59 percent of the weight of the additive; and zirconium in a range from about 2 percent to about 27 percent of the weight of the additive.

* * * * *